United States Patent [19]
Goode et al.

[11] Patent Number: 5,315,831
[45] Date of Patent: May 31, 1994

[54] LIQUID NATURAL GAS AND COMPRESSED NATURAL GAS TOTAL FUELING SYSTEM

[75] Inventors: John E. Goode; Michael D. Hoyle, both of Arlington; Raymond E. Lance, Fort Worth, all of Tex.

[73] Assignee: Hydra-Rig, Incorporated, Ft. Worth, Tex.

[21] Appl. No.: 9,210

[22] Filed: Jan. 22, 1993

[51] Int. Cl.$^5$ ............................................. F25B 19/00
[52] U.S. Cl. ..................................... 62/7; 62/50.1; 62/50.2; 123/525; 123/527; 137/210; 137/567; 141/4; 220/330
[58] Field of Search ............... 222/330; 95/237; 137/210, 567; 123/525, 527; 141/4, 82; 62/7, 50.1, 50.2

[56] References Cited

U.S. PATENT DOCUMENTS

| | | | |
|---|---|---|---|
| 2,732,103 | 1/1956 | Wright et al. | 222/330 |
| 4,321,796 | 3/1982 | Kohno | 62/50.2 |
| 4,680,937 | 7/1987 | Young | 137/210 |
| 4,738,115 | 4/1988 | Goode | 62/50.3 |
| 5,107,906 | 4/1992 | Swenson et al. | 141/4 |
| 5,127,230 | 7/1992 | Nesser et al. | 62/7 |
| 5,147,005 | 9/1992 | Haeggstrom | 62/7 |
| 5,163,409 | 11/1992 | Gustafson et al. | 62/50.2 |
| 5,228,295 | 7/1993 | Gustafson et al. | 62/7 |

*Primary Examiner*—Ronald C. Capossela
*Attorney, Agent, or Firm*—Marc A. Hubbard

[57] ABSTRACT

In a combined liquid natural gas and compressed natural gas fueling station, liquid natural gas is stored in a cryogenic tank and dispensed to vehicles on demand. Compressed natural gas is produced on demand from the liquid natural gas by a high-efficiency pump and vaporizer system and dispensed directly to vehicles or stored for later dispensing. For greater efficiency, the pump and vaporizer system is powered by combustion of natural gas, including gas bled off to relieve pressure from the cryogenic tank.

23 Claims, 1 Drawing Sheet

LIQUID NATURAL GAS AND COMPRESSED NATURAL GAS TOTAL FUELING SYSTEM

FIELD OF THE INVENTION

The field of this invention relates generally to fueling stations, and more particularly to natural gas fueling stations.

BACKGROUND OF THE INVENTION

Interest in the use of compressed natural gas (CNG) and liquid natural gas (LNG) as a motor vehicle fuel has increased dramatically in recent years. Whole fleets of government and industry vehicles have successfully been converted to natural gas, and some private individuals have converted their vehicles as well. Congress recently passed an energy bill which would require further increased use of alternative fuels in government and private fleets.

Several factors have influenced this increasing interest in natural gas as a motor vehicle fuel. Natural gas burns cleaner than traditional motor vehicle fuels. Using natural gas in motor vehicles thus lowers vehicle emissions dramatically, reducing the environmental impact of motor vehicles. Engines burning natural gas also remain cleaner longer, which results in less wear on the engine, less degradation of fuel efficiency and emissions cleanliness over time, and less frequent and lower service and repair costs. Also, natural gas is a relatively cheap and plentiful natural resource within the United States.

A limiting factor in the expanding use of natural gas as a motor vehicle fuel has been the availability of natural gas filling stations. Current stations are expensive to construct and operate. The expense and inefficiency of current refueling stations has prevented widespread conversion to natural gas, especially by private individuals. Fleet conversions are more economically viable because of the large number of vehicles that are consistently refueled at one central location. But private individuals often have no access to a natural gas refueling station, or their access is limited to fleet refueling stations that also sell to private customers. These fleet refueling stations are found only in larger metropolitan centers, effectively restricting the range of private users' vehicles. Thus there is a need for a less expensive, more efficient natural gas fueling station so that more such stations can be constructed and operated, better meeting the needs of private individuals as well as fleet owners who would like to convert their vehicles to natural gas.

Natural gas powered vehicles store the natural gas in their tanks as either compressed natural gas (CNG) or liquid natural gas (LNG). Current LNG filling stations dispense LNG from LNG storage tanks which are supplied by LNG tanker trucks. Current CNG filling stations take natural gas from a natural gas pipeline, compress it, and store it in high-pressure storage tanks from which it is dispensed. The compression requires large amounts of equipment and energy, significantly increasing the cost of the station and the CNG it supplies. A second problem is that natural gas from pipelines is only about 80% pure. Purification procedures are not easily able to eliminate the contamination found in natural gas pipelines. Without expensive purification procedures, the natural gas is not pure enough to burn cleanly, and the major benefits of natural gas are lost. With expensive purification procedures, the CNG cannot be priced competitively with other fuels. A third problem is CNG stations using existing technology can only be located in areas serviced by natural gas pipelines.

SUMMARY OF THE INVENTION

The present invention provides for a natural gas filling station system and method which provides a cost-effective, high-purity source of CNG, and which dispenses both LNG and CNG from the same system with greater efficiency and simplicity than current systems and methods. CNG is produced at the station from stored LNG by a high-efficiency vaporization process. This provides a cost-efficient source of high-purity CNG. No purification process is required, and the benefits of natural gas are preserved. LNG and CNG are both dispensed at the same station from an efficient, unitary system, providing greater economy of operation. Greater economies of scale are also provided, since the ability to refuel both LNG and CNG vehicles insures higher total traffic at such a station. The stored LNG can be delivered by LNG tanker trucks, eliminating the typical CNG station's dependence on pipeline connections.

In a preferred embodiment of the invention, LNG is stored in tanks and dispensed to LNG vehicles or other containers through an LNG dispenser. LNG from storage is also converted by a high efficiency pump and vaporizer system to CNG for direct dispensing to CNG vehicles or containers, or for storage and later dispensing. The pump and vaporizer system can be powered by natural gas, resulting in further reduced costs from reduced consumption of electricity and other forms of energy.

DETAILED DESCRIPTION OF THE PREFERRED EMBODIMENTS

Figure 1:
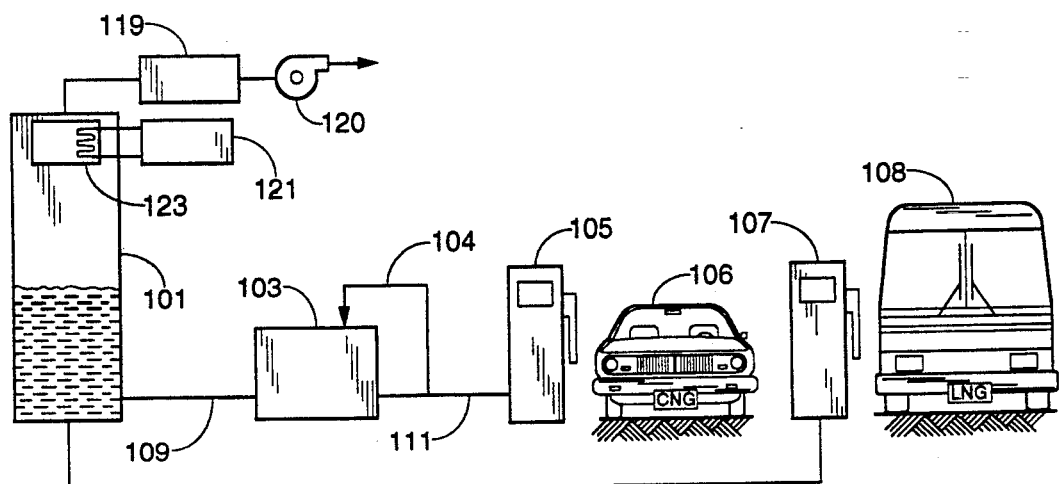
FIG. 1 is a diagrammatic view of one embodiment of a fueling station according to the present invention.
Figure 2:
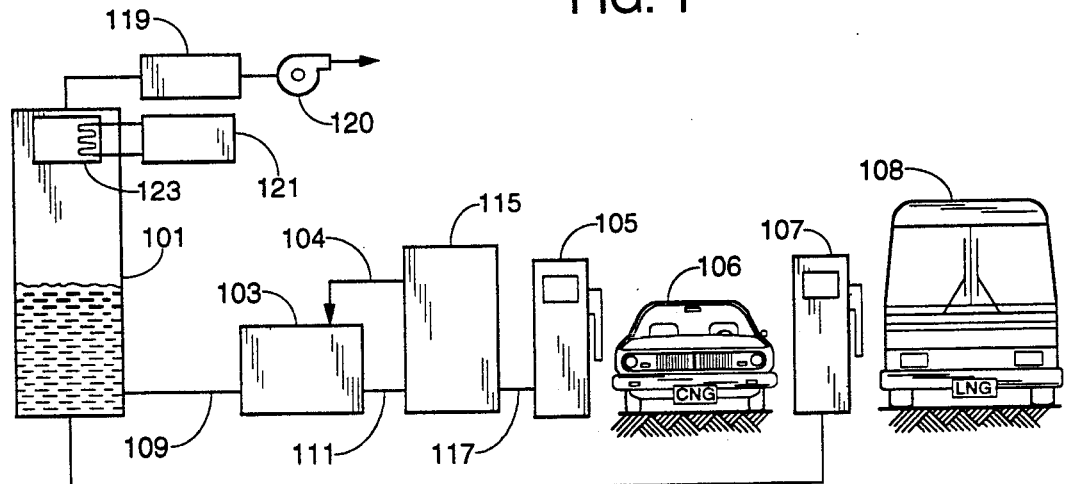
FIG. 2 is a diagrammatic view of another embodiment of a fueling station according to the present invention.
Figure 3:
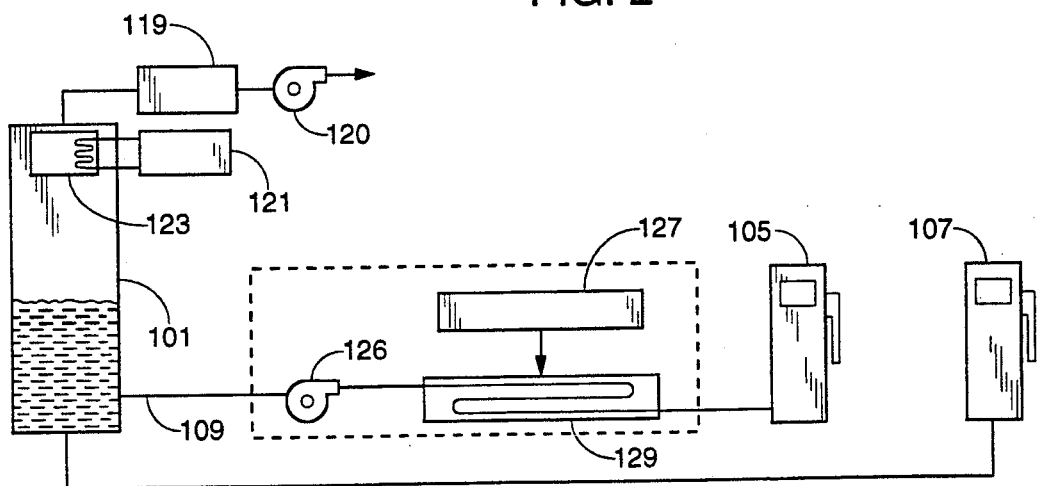
FIG. 3 is a diagrammatic view of another embodiment of a fueling station according to the present invention.

Referring to FIGS. 1, 2 and 3, a cryogenic tank 101 contains a reservoir of liquid natural gas from which the rest of the station's components are supplied. The cryogenic tank 101 would be supplied by liquid natural gas tanker trucks or other suitable source. A liquid natural gas dispenser 107 is supplied directly from cryogenic tank 101 by a liquid natural gas conduit 113. A vehicle requiring liquid natural gas 108 is refueled at this liquid natural gas dispenser 107.

Referring now to FIGS. 1 and 2 only, liquid natural gas conduit 109 supplies a pump and vaporizer system 103 with liquid natural gas from cryogenic tank 101. Pump and vaporizer system 103 produces, on demand, from liquid natural gas, compressed natural gas at controlled temperatures and pressures. The pump and vaporizer system is preferably a high-efficiency pump and vaporizer system is described in U.S. Pat. No. 4,738,115 which is incorporated herein by reference.

According to the pump and vaporizer system of U.S. Pat. No. 4,738,115, a cryogenic liquid is pressurized by a high-pressure pump driven by an internal combustion engine. Excess heat produced by the engine is used to vaporize the high-pressure liquid to obtain compressed gas. If more heat is needed for vaporization that is generated by the engine under the load of the high-pressure pump alone, the engine is further adjustably loaded by a dynamometer, whose fluid's heat is also used for vaporization. This system allows precise control of the temperature, pressure, and rate of delivery of the compressed gas being produced. This system also provides for highly efficient use of the total energy produced by the fuel burned in the engine. Use of this or another highly efficient pump and vaporizer system in the present invention allows for cost-effective production of high-purity CNG, preserving the advantages of CNG as a motor vehicle fuel. For greatest simplicity and efficiency, pump and vaporizer system 103 is powered by combustion of natural gas present at the station, as represented by supply line 104.

Compressed natural gas conduit 111 supplies compressed natural gas dispenser 105 on demand with compressed natural gas. A vehicle requiring compressed natural gas 106 is refueled at dispenser 105.

Referring now to FIG. 3 only, other alternate methods of pumping and vaporizing the LNG may used, depending on the location of the facility and the availability and cost of various forms of energy and equipment for vaporizing and pumping. One acceptable method includes, for example, pressurizing LNG with a pump driven by an electric motor and then vaporizing the compressed LNG in heat exchanger 129 with heated water supplied by a water heater 127. Heat generated from other sources of energy to vaporize the LNG may be used. Energy sources include ambient air, solar energy, electricity, petroleum-based fuels, or waste energy from other processes, with heat being stored and delivered to the heat exchanger by steam, water, air, or any other suitable substance or material.

Referring to FIGS. 1, 2 and 3, natural gas, on occasion, must be vented from tank 101 when the pressure of gas within the tank exceeds a maximum safe pressure. Pressure builds when LNG in the tank boils, trapping gas in the tank. Also, although it is not illustrated, natural gas vented from vehicles 106 and 108 is returned to and collected in tank 101. It is desirable, generally, to maintain natural gas in the tank for compressing the LNG to keep it in saturated liquid state. However, when the pressure exceeds a desirable maximum pressure, a venting system 119 automatically vents the gas from the tank. In some instances, the natural gas is vented to the atmosphere. However, in many locations, venting of methane into the atmosphere is undesirable, unsafe or unlawful. The venting system therefore includes a small, relatively inexpensive compressor 120 to boost the pressure of the vented natural gas, if necessary, to the tank to the downstream pressure of a natural gas pipeline. The vent gas, after being metered is then sold to the operator of the pipeline.

In locations in which venting of gas into the atmosphere is undesirable, dangerous or unlawful or where there is no natural gas pipeline, a refrigeration system 121 cools condenser or heat exchanger 123, which is located inside the tank 101, below the condensing temperature of methane to recondense the methane gas, or at least to cool the gas enough to collapse some of the pressure in the tank. The refrigeration system 121 may be one of many conventional system used to condense methane gas into LNG, again depending on the resources available to the fueling station. For example, it could be a closed system in which a refrigerant is compressed and then expanded in a condenser. The methane gas is then passed over the condenser. It could also be an open system using liquid nitrogen or some other inert cryogenic fluid that is cooler the condensing point of methane and that can be safely released into the atmosphere. The liquid nitrogen flows through the heat exchanger or condenser, cooling or condensing the methane gas and causing the liquid nitrogen to vaporize. The nitrogen vapor is then released to the atmosphere. The supply of liquid nitrogen must, of course, be replaced periodically.

Referring now to FIG. 2, illustrated is an alternate embodiment similar to the embodiment of FIG. 1 except that the compressed natural gas supplied by the pump and vaporizer system 103 is conducted through conduit 111 to compressed natural gas storage tank 115. Compressed natural gas is then supplied on demand from storage tank 115 through compressed natural gas conduit 117 to dispenser 105 for dispensing to vehicles requiring compressed natural gas. The second storage tank 115 permits accumulation of compressed natural gas for dispensing from more than one dispenser or during peak demand periods when demand exceeds the capacity to produce the compressed gas from the liquid natural gas. Also, accumulating compressed natural gas in tank 115 assures a constant supply for dispensing when the heat for vaporizing the liquid natural gas is inconsistent or not available on demand, such as waste energy from another process or solar energy.

The foregoing detailed description is given by way of example only. The scope of the invention is limited solely by the appended claims.

What is claimed is:

1. A natural gas fueling station apparatus for dispensing both liquid natural gas and compressed natural gas to natural gas vehicles or other suitable containers comprising:
   a first storage tank for storing liquid natural gas from which to supply the natural gas filling station with natural gas;
   a first dispenser for dispensing liquid natural gas;
   means for producing, from liquid natural gas, compressed natural gas;
   a second dispenser for dispensing compressed natural gas; and,
   the first dispenser and the means for producing being supplied with liquid natural gas from the first storage tank by a liquid natural gas conduit, the second dispenser being supplied with compressed natural gas from the means for producing by a means for supplying compressed natural gas.

2. The natural gas fueling station of claim 1 wherein the means for producing includes a work producing system powered by natural gas.

3. The natural gas fueling station of claim 1 wherein the compressed natural gas supplying system further comprises:
   a second storage tank for storing compressed natural gas produced by the pump and means for producing;
   a first compressed natural gas conduit for supplying the second storage tank with compressed natural gas from the means for producing; and
   a second compressed natural gas conduit for supplying the second dispenser with compressed natural gas from the second storage tank.

4. The natural gas fueling station of claim 1 wherein the means for producing includes a gas-fired water heater for supplying heated water to a heat exchanger for heating liquid natural gas.

5. The natural gas fueling station of claim 4 wherein the means for producing further includes an electric pump for compressing the liquid natural gas for the storage tank prior to heating the liquid natural gas.

6. The natural gas fueling station of claim 1 wherein the means for producing includes means for heating liquid natural gas with waste heat produced by another process.

7. The natural gas fueling station of claim 1 wherein the storage tank includes a venting system, means for collecting and delivering natural gas vented from the storage tank to a pipeline.

8. The natural gas fueling station of claim 1 further including means for condensing natural gas in the storage tank to relieve pressure within the tank.

9. A method of supplying both liquid natural gas and compressed natural gas from the same station for dispensing to natural gas vehicles or other suitable containers comprising the steps of:
delivering liquid natural gas to a storage tank;
dispensing liquid natural gas from the storage tank on demand to a first vehicle requiring liquid natural gas through a first dispenser;
vaporizing liquid natural gas from the storage tank to produce compressed natural gas on demand; and
dispensing the compressed natural gas to a second vehicle requiring compressed natural gas through a second dispenser.

10. The method of claim 9 wherein the step of vaporizing includes pressurizing the liquid natural gas with a pump and heating the compressed liquid natural gas to produce compressed natural gas.

11. The method of claim 10 wherein the step of heating includes heating water with a water heater and transferring the heat in the water to the liquid natural gas to vaporize it.

12. The method of claim 9 wherein the step of vaporizing includes heating the liquid natural gas with waste given off by a process separate from that of the method.

13. The method of claim 9 wherein the step of vaporizing includes transferring heat from steam to the liquid natural gas.

14. The method of claim 9 wherein the step of vaporizing includes transferring heat produced by combustion of natural gas to the liquid natural gas.

15. The method of claim 9 wherein the step of vaporizing includes transferring heat of ambient air to the liquid natural gas.

16. The method of claim 9 further comprising the step of condensing natural gas in the storage tank using a condenser disposed in the tank to avoid venting natural gas into the atmosphere when pressure in the tank reaches unsafe levels.

17. The method of claim 9 further including the steps of venting natural gas from the storage tank to relieve pressure, and providing the gas to a natural gas pipeline system.

18. The method of claim 9 wherein the step of vaporizing includes:
pressurizing the liquid natural gas with a pump driven by an internal combustion engine; and,
vaporizing the pressurized liquid natural gas with heat produced by the internal combustion engine.

19. The method of claim 18 further comprising the step of providing, when needed for vaporization at desired pressures and rates, heat from the internal combustion engine in excess of the heat produced by the pumping load by:
variably loading the internal combustion engine with a dynamometer according to the demand for heat; and,
using the heat produced in the dynamometer fluid for vaporizing the pressurized liquid natural gas, in addition to the heat produced directly by the internal combustion engine.

20. The method of claim 9 further comprising the step of storing the compressed natural gas in a second storage tank wherein the step of dispensing to a second vehicle includes dispensing compressed natural gas on demand from the second storage tank to the second vehicle requiring compressed natural gas through the second dispenser.

21. The method of claim 20 wherein the step of vaporizing includes the step of combusting natural gas and heating the liquid natural gas with heat produced from the combustion.

22. The method of claim 20 wherein vaporizing includes:
pressurizing the liquid natural gas with a pump driven by an internal combustion engine; and
vaporizing the pressurized liquid natural gas with heat produced by the internal combustion engine.

23. The method of claim 20 wherein the step of vaporizing includes the step of heating the liquid natural gas with the heat produced from an unsteady source.

* * * * *